United States Patent [19]

Fechter et al.

[11] 4,020,674

[45] May 3, 1977

[54] PIPELINE LEAK DETECTOR WITH BAFFLES

[76] Inventors: Harry Robert Fechter, 2298 Capistrano, Las Vegas, Nev. 89121; George Brown Walker, 118115 93rd Ave., Edmonton, Alberta, Canada

[22] Filed: May 19, 1976

[21] Appl. No.: 688,071

[52] U.S. Cl. .......................................... 73/40.5 R
[51] Int. Cl.² ..................................... G01M 3/28
[58] Field of Search ................. 73/40.5 R, 49.1, 40

[56] References Cited

UNITED STATES PATENTS

| | | | |
|---|---|---|---|
| 2,951,362 | 9/1960 | En Dean et al. | 73/40.5 R |
| 3,016,733 | 1/1962 | En Dean et al. | 73/40.5 R |
| 3,732,434 | 5/1973 | French | 73/40.5 R X |
| 3,782,172 | 1/1974 | McCarron | 73/40.5 R |

*Primary Examiner*—Richard C. Queisser
*Assistant Examiner*—Joseph W. Roskos

[57] ABSTRACT

A device for detecting and locating leaks in pipelines through which a stream of fluid flows under pressure. The device includes an elongate body portion providing support for axially spaced sets of plural radially extending baffles, fore and aft of the stream and of a diameter less than the inside diameter of the pipe to be probed; and an intermediate portion including a differential pressure measuring device and recorder which forms with the inner pipe wall, a chamber normally maintained at the stream pressure as the device is propelled through the pipe at the speed of fluid flow. As the device passes a leak fluid pressure in the chamber is reduced due to the substantial isolating affect of the baffles from the up and down stream pressures with a resultant recording indicative of the leak location, while eliminating the need of totally sealing off the chamber.

6 Claims, 2 Drawing Figures

PIPELINE LEAK DETECTOR WITH BAFFLES

BACKGROUND OF THE INVENTION

Devices for the detection of leaks in pipelines are well known and emply various scientific principles. Some employ the sound emitted as pressurized fluid escapes through a break in the pipe. Others utilize resultant sonic waves to detect at a distance from the break. Others utilized pressure drop in the immediate area of the leak, as does the present invention. However, known devices employing the pressure drop principle have either employed sealing rings to establish a chamber isolated from the stream, or have plugged the leak momentarily to provide a null indicative of the location of the leak. Since pipelines are seldom truly circular in cross section, sealing rings often fail. Cylindrical plugs of sound absorbing materials adapted to plug the leak present operational and maintenance problems not associated with the leak detectors disclosed herein.

SUMMARY OF THE INVENTION

A primary object of the invention is to provide an improved device for the detection and location of a leak occurring in a pipeline, through which fluid flows under pressure.

Another object is to provide a leak detector of high sensitivity and adapted to record the presence of a leak as the detector moves downstream at substantially the speed of fluid flow, while avoiding the necessity of using packing rings or other fluid seals to isolate a chamber in which a recordable pressure drop occurs as the detector passes over the leak area.

A further object is to provide an elongate detector with sets of baffles spaced fore and aft of an intermediate portion which form, with the internal wall of the pipeline, a chamber for pressure drop detection.

Other objects and advantages will become apparent to persons skilled in the art, upon examination of the specifications and the appended drawings.

BRIEF DESCRIPTION OF THE DRAWINGS

In the drawings in which like parts are identified by the same reference numeral.

DETAILED DESCRIPTION OF THE INVENTION

Figure 1:
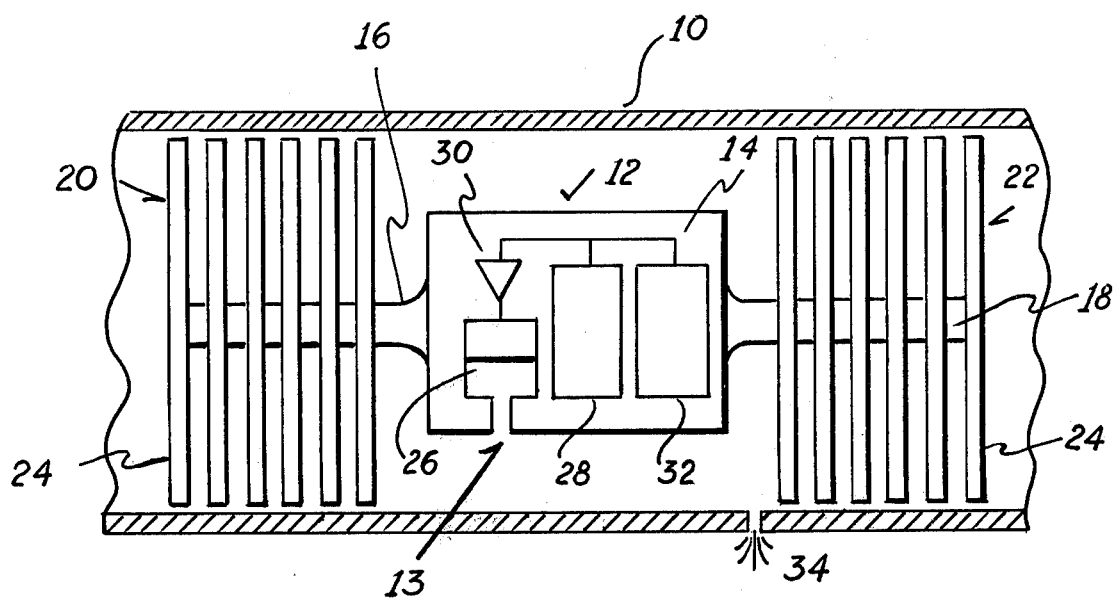
FIG. 1 shows in vertical section, a leak detector for recording and transmitting a pressure drop in the area of the leak.

Referring to FIG. 1, a pipeline 10, containing presurized fluid, such as crude oil, has disposed therein a pressure detecting device generally designated 12. Various types of devices are commonly fed into the stream of pressurized fluid within a pipeline to move downstream at approximately the rate of fluid flow. Some are designed internally to clean or coat the pipe, while others function to isolate two different types of fluids flowing therethrough. All types are commonly referred to in the trade as "pigs". Detector 12 is one type of pig and includes a suitable framework with a central portion 14, leading into axially aligned rod-like portions 16 and 18, for the support of baffle units 20 and 22, each comprising a plurality of axially spaced discs 24. The central portion of frame 14 provides support for a pressure sensor 26, a recorder 28, an amplifier 30, and optionally, a leak signal transmitter 32.

As detector 12 moves or floats downstream, a small back pressure differential is established between the outermost disc 24 of the downstream baffle and the trailing disc of baffle unit 22. This pressure differential is sufficient, in a viscous fluid, such as oil, to maintain what amounts to an annular hydraulic bearing defined between circumferential portions of the axially spaced baffle discs 24, and the wall of the pipe 10, hydraulically to retain unit 22, concentrically within pipe 10. Since chamber 13 is normally at or near stream pressure a similar concentric alignment of aft baffle unit 20 results to insure alignment of detector unit 12 axially of pipe 10, with minimum yaw during downstream travel. In addition to insuring concentricity of spaced baffle structures, hence the detector, a slight pressurization of viscous fluid, such as crude oil, effectively isolates intermediate chamber 13 to insure, at least momentarily, detectable pressure tops therein as the detector passes over even a small leak in pipeline 10, such as leak 34. A minor portion of the total drop occurs as downstream baffle assembly 22 moves over leak 34, with resulting disturbance of the viscous fluid. However, the plurality of axially spaced baffles discs 24, of a diameter defining a narrow annular space with the pipe wall, serves substantially to isolate chamber 13 until the training disc 24 of baffle unit 22 clears the leak with a resulting spike-like pressure drop component being established in the baffle isolated chamber, immediately upon passage of baffle 22 over leak 34.

The pressure drop within chamber 13, above described, actuates the pressure sensor 26, and its output signal, amplified at 30, is fed to recorder 28, which may be read at a downstream station to indicate the leak location. Optionally, a leak signal transmitter 32 may establish sonic waves within the pipeline fluid for a remote readout and a more rapid tabulation of a leak position.

Since the rod-like frame members 16 and 18 of FIG. 1 structure are solid sensor 26 is of the type for measurement of the pressure drop within the chamber 13 against a built-in load, rather than pressure differential between the stream and the chamber pressure.

Figure 2:
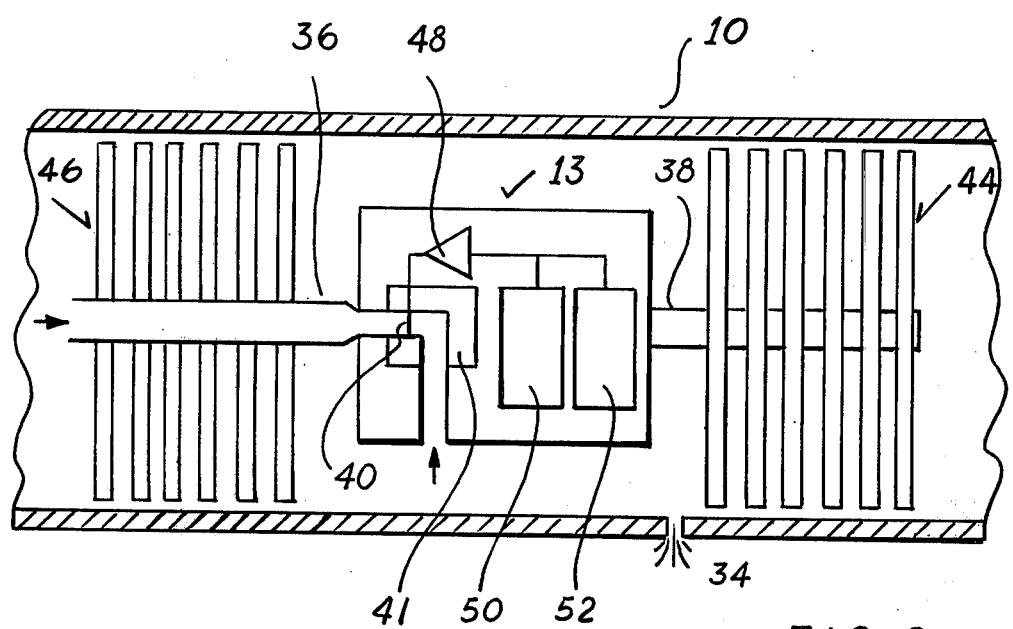
FIG. 2 shows in vertical section a modification of the invention, including means for sensing and recording a pressure differential between the stream pressure and a pressure drop in the immediate area of a leak.

As shown in FIG. 2, a device, somewhat similar to the FIG. 1 apparatus, includes a tubular conduit 36, in place of the corresponding solid rod 16 of FIG. 1. As shown by arrows, the upstream pressure is sensed by conduit 36, which leads to one side of pressure sensor 40, the opposite side of which opens to chamber 13, to indicate the differential component between stream and chamber pressure.

We claim:

1. An apparatus for the detection of leaks in pipelines comprising:
   a. An elongate body portion adapted to move axially within the pipeline,
   b. A pair of spaced baffles supported by said body portion, each comprising a plurality of axially spaced circular discs of a diameter less than the internal diameter of the pipeline,
   c. Said baffles defining there between an intermediate chamber and a pressure sensor supported by said body portion for indication of a decrease in chamber pressure as the detection apparatus passes a pipeline leak.

2. The apparatus of claim 1 including means for conducting the fluid stream pressure to the interior of said chamber,
   a. And means series connecting said pressure sensor between said fluid stream conducting means and said chamber.
3. The apparatus of claim 1 wherein said elongate body portion includes a frame-like center portion leading at opposite ends thereof into aligned rod-like elements,
   a. A plurality of circular discs mounted concentrically on each of said rod-like portions in axially spaced relation to provide a pair of baffle units,
   b. Said discs being of a diameter slightly less than a pipeline through which the apparatus is adapted to travel at substantially the speed of a fluid stream.
4. A device for detecting leaks in a pipeline through which a stream of pressurized fluid flows, and having in combination,
   a. A frame-like structure providing support for a tubular conduit, said conduit extending in an upstream direction and open at its upstream end to the stream, said conduit being closed at its downstream end by a pressure differential sensor element extending transversely of said conduit,
   b. A rod-like element fixed to said structure in axial alignment with, and in spaced relation to said tubular conduit,
   c. A set of baffles comprising a plurality of axially spaced discs fixed to said conduit, said discs being of a slightly lessor diameter than the pipeline in which it is adapted to move with the stream, said baffles defining a narrow annular channel between the outer disc walls and the pipeline interior.
   d. A like set of baffle discs fixed to said rod-like element to provide a pressure drop chamber intermediate the sets of baffles in which said frame-like structure is disposed,
   e. Means for subjecting the exposed side of said sensor to the fluid within said chamber,
   f. And means associated with said sensor for amplifying and recording pressure drops within said chamber as sensed by said sensor.
5. The device of claim 4 wherein said baffle discs are of a diameter at least 90% of the interior diameter of the pipeline.
6. The device of claim 4 wherein the pressure differential sensor includes a strain gauge mounted transversely of the tubular element is fluid sealing relation thereto, a circuit associated with said gauge for generation of an output signal responsive to the flexing of said gauge when subjected to pressure differentials.

* * * * *